Oct. 12, 1937.  T. KUROKOCHI ET AL  2,095,818

CONTROL SYSTEM

Filed July 31, 1936

Inventors:
Tsutomu Kurokochi,
Isao Miyamoto,
by Harry E. Dunham
Their Attorney.

Patented Oct. 12, 1937

2,095,818

UNITED STATES PATENT OFFICE 2,095,818

CONTROL SYSTEM

Tsutomu Kurokochi and Isao Miyamoto, Omoriku, Tokyo, Japan, assignors to General Electric Company, a corporation of New York Application July 31, 1936, Serial No. 93,707
In Japan August 31, 1935

2 Claims. (Cl. 118—43)

This invention relates to a control system for thread winding devices in spinning which is characterized in that a roller for tightening and guiding the thread is associated with the motor which drives an alternator for energizing a spindle motor with the output frequencies of the alternator, and its object is to provide a system for operating spinning thread winding devices for simultaneously stopping the roller and the spindle motor, and thereby preventing the breaking of the thread owing to its over-twisting and also suitable for individual driving of the bobbin.

Figure 1:
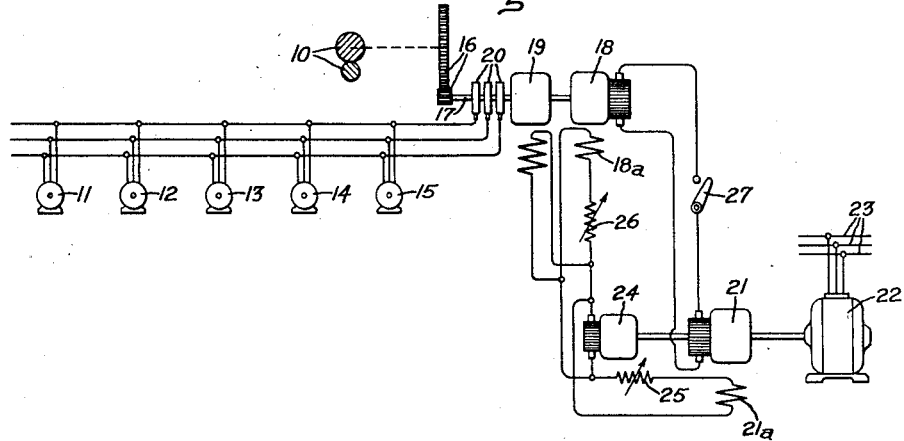
Figure 2:
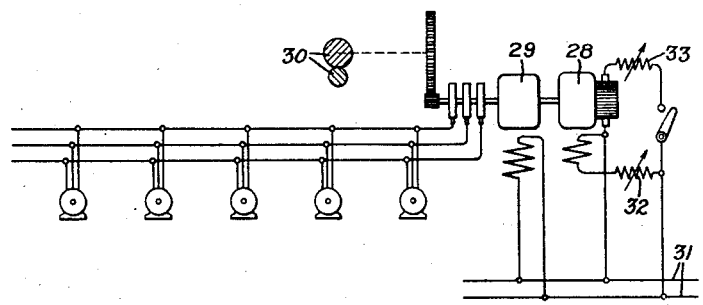

Fig. 1 of the accompanying drawing is a diagrammatic view of the operating system for the spinning thread winding device embodying this invention and Fig. 2 is a modified arrangement.

In the spinning industry, the guide roller for leading the thread to a bobbin stops quickly when the driving power is removed but the spindle driving motor continues to rotate for a certain period owing to inertia so that the thread is likely to be broken owing to the resulting over-twisting.

An object of this invention is to stop the guide roller and bobbin driving motor simultaneously in a simple and positive manner.

Referring now to the drawing, thread is passed through a guide roller or drawing roller 10 to a plurality of bobbins or spindles not shown. Each of these spindles is separately driven by a corresponding one of a plurality of induction motors 11, 12, 13, 14 and 15. The draw rolls 10 are connected through gearing 16 to the shaft 17 of a motor generator set illustrated as comprising a direct current motor 18 and an alternating current generator 19, driven thereby. If desired the motor 18 and alternator 19 may be combined into a single machine having a common direct current field excitation. The spindle motors 11, 12, 13, 14 and 15 are connected to the slip rings 20 of alternator 19 and are supplied with alternating voltage of the required frequency so that the spindle motors rotate at a speed proportional to the speed of motor 18. Consequently, the spindles and draw rolls 10 are driven at corresponding speeds. The frequency of the alternating voltage generated by the alternator 19 may be varied to change the speed of the spindle motors as desired. The voltage can be maintained substantially constant by varying the field excitation. The direct current motor 18 is supplied from a direct current generator 21 which is driven by suitable driving means illustrated as an alternating current induction motor 22 supplied from a suitable source represented by supply lines 23. Generator 21 is provided with a field winding 21a which is supplied from an exciter 24 driven by induction motor 22. In order to control and vary the speeds of the motor 18 and the spindle motors 11, 12, 13, 14 and 15, a variable resistance 25 is included in circuit with the field winding 21a for varying the voltage of generator 21. This resistance is preferably actuated by or controlled in accordance with the operation of the speed regulating device of the ring, rail or spindle frame which in turn is controlled by the builder motion. Motor 18 is provided with a field winding 18a which is also supplied from exciter 24. A variable resistance 26 is included in circuit with field winding 18a for varying the basic speed of the motor 18. A main switch 27 is included in the loop circuit of the armatures of generator 21 and motor 18.

With the connection and arrangement as described in the foregoing, the speed regulating device controlled by the ring rail will regulate the resistance 25 as the thread is wound on a bobbin to regulate the voltage supplied to direct current motor 18 and will thereby regulate the output frequency of the alternating current generator 19 so that the speed of rotation of the spindle motors 11, 12, 13, 14, 15, etc., is changed as desired and the tension of the thread can be maintained at constant throughout the winding operation. When the switch 27 is opened in order to stop the bobbin the supply of current to the direct current motor 18 is interrupted and the output frequency of the alternator 19 will be gradually reduced in accordance with the stopping operation of the motor 18. The voltage of alternator 19 will be sufficiently high as the speed decreases if the excitation supplied by the exciter 24 is maintained constant. Thus, spindle motors 11, 12, 13, 14, 15, etc., will receive an input of gradually diminishing frequency and the motor 18 and spindle motors 11, 12, 13, 14, 15, etc., remain in substantial synchronism as their speeds are gradually reduced following to the decaying frequency or alternator 19. When the generator 18, 19 is stopped, the generated alternating current frequency becomes zero and the spindle motors are likewise stopped. This is due to the fact that the spindle motors, which are induction motors are subjected continuously to a large braking force as they approach the synchronous speed of the decreasing supply frequency. Since the guide roller 10 is connected to motor 18 and various other parts it stops simultaneously with the stopping of the motor generator 18, 19 and accordingly the roller 10 and the spindle motors are stopped substantially simultaneously. As a result trouble due to breaking of threads is avoided.

In the modification of Fig. 2, the motor 28 which drives the alternator 29 and the guide roller 30 is supplied from a direct current source represented by supply lines 31. Speed varying resistances 32 and 33 are included in the field and armature circuits of motor 28. Otherwise, the arrangement and operation are the same as previously described in connection with Fig. 1.

Thus in the present invention the alternator 19 is driven by a roller driving motor and the spindle driving alternating current motors are energized with the alternating current power of a generated frequency corresponding to the driving speed of the roller so that the individual driving of the bobbin can be carried out simply and moreover the present invention has the advantage that the spindle motor can be stopped or its speed changed almost simultaneously with that of the roller.

What we claim as new and desire to secure by Letters Patent of the United States is:

1. A control system for textile machinery and the like comprising a plurality of alternating current induction motors for driving the spindles, a roller for guiding and tightening the threads supplied to the spindles, a direct current motor for driving said roller, a generator for supplying said direct current motor, a variable resistance in the field circuit of said generator for varying the voltage thereof in accordance with a winding condition of the thread on the bobbin, and an alternator driven by said direct current motor for supplying said spindle driving induction motors so that said spindle motors and roller driving motors operate in substantial synchronism.

2. A control system for spinning apparatus and the like comprising a plurality of alternating current motors for driving a plurality of spindles, a roller for guiding threads to said spindles, a source of direct current, a motor supplied from said source for driving said guide roller, said motor having a field winding, a variable resistance in circuit with said field winding adapted to be actuated in accordance with the winding condition of a bobbin for controlling the speed of said roller driving motor, and an alternator driven by said roller driving motor for supplying a voltage to said spindle motors having a frequency proportional to the speed of said roll driving motor so that said roller and spindles are operated in substantial synchronism.

TSUTOMU KUROKOCHI.
ISAO MIYAMOTO.